(12) United States Patent
Kubota et al.

(10) Patent No.: US 9,028,055 B2
(45) Date of Patent: May 12, 2015

(54) NONAQUEOUS INK COMPOSITION FOR INK JET RECORDING AND INK JET RECORDING METHOD

(71) Applicant: Seiko Epson Corporation, Tokyo (JP)

(72) Inventors: Kenichiro Kubota, Shiojiri (JP); Makoto Nagase, Shiojiri (JP); Maki Ito, Shiojiri (JP); Keiji Iida, Chikuhoku-mura (JP); Akihito Sao, Matsumoto (JP)

(73) Assignee: Seiko Epson Corporation, Suwa-shi (JP)

( * ) Notice: Subject to any disclaimer, the term of this patent is extended or adjusted under 35 U.S.C. 154(b) by 89 days.

(21) Appl. No.: 13/677,569

(22) Filed: Nov. 15, 2012

(65) Prior Publication Data

US 2013/0120492 A1    May 16, 2013

(30) Foreign Application Priority Data

Nov. 15, 2011 (JP) .................................. 2011-249423
Nov. 15, 2011 (JP) .................................. 2011-249597

(51) Int. Cl.
*B41J 2/01*    (2006.01)
*C09D 11/36*    (2014.01)
*B41J 2/04*    (2006.01)
*C09D 11/30*    (2014.01)
*B41J 2/21*    (2006.01)
*B41M 5/00*    (2006.01)

(52) U.S. Cl.
CPC . *C09D 11/36* (2013.01); *B41J 2/04* (2013.01); *C09D 11/30* (2013.01); *B41J 2/2107* (2013.01); *B41M 5/0047* (2013.01); *B41M 5/0064* (2013.01)

(58) Field of Classification Search
CPC .............. B41J 2/01; B41J 2/2107; B41J 2/04; B41J 2/015; C09D 11/30; C09D 11/322; C09D 11/36; B41M 5/0047; B41M 5/0064

USPC ............ 347/95–100, 101, 105; 523/160, 161; 106/31.13, 31.27, 31.6
See application file for complete search history.

(56) References Cited

U.S. PATENT DOCUMENTS

| | | | |
|---|---|---|---|
| 2004/0094067 A1 | 5/2004 | Oyanagi et al. | |
| 2004/0254265 A1* | 12/2004 | Mizutani et al. | 523/160 |
| 2004/0266907 A1* | 12/2004 | Sugita et al. | 523/160 |
| 2009/0118418 A1* | 5/2009 | Nakano et al. | 524/556 |
| 2009/0153639 A1* | 6/2009 | Shinohara et al. | 347/188 |
| 2011/0292141 A1* | 12/2011 | Sao et al. | 347/100 |
| 2012/0056929 A1 | 3/2012 | Sao et al. | |

FOREIGN PATENT DOCUMENTS

| | | | |
|---|---|---|---|
| JP | 2005-200469 A | | 7/2005 |
| JP | 2007146002 A | * | 6/2007 |
| JP | 2011-246571 A | | 12/2011 |
| JP | 2012-052057 A | | 3/2012 |
| WO | 02-055619 A1 | | 7/2002 |

* cited by examiner

*Primary Examiner* — Matthew Luu
*Assistant Examiner* — Rut Patel
(74) *Attorney, Agent, or Firm* — Nutter McClennen & Fish LLP; John J. Penny, Jr.

(57) ABSTRACT

The nonaqueous ink composition for ink jet printing contains a compound represented by General Formula (1) below, and a heterocyclic compound selected from lactones and lactams.

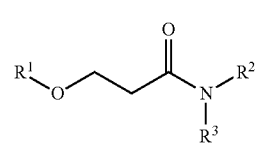

(1)

(In Formula (1), $R^1$ represents an alkyl group having 1 to 4 carbon atoms, and $R^2$ and $R^3$ represent a methyl group or an ethyl group.)

14 Claims, No Drawings

NONAQUEOUS INK COMPOSITION FOR INK JET RECORDING AND INK JET RECORDING METHOD

The entire disclosure of Japanese Application No.: 2011-249423 filed on Nov. 15, 2011 and 2011-249597 filed on Nov. 15, 2011 are expressly incorporated by reference herein.

BACKGROUND

1. Technical Field

The present invention relates to a nonaqueous ink composition for ink jet recording and an ink jet recording method using the same.

2. Related Art

An ink jet recording method to record an image and letters on a water absorptive recording medium such as paper using minute ink droplets which are discharged from the nozzle of the ink jet recording head has been known hitherto. As an ink used in such an ink jet recording method, an aqueous ink which uses water as the main solvent has been widely adopted. However, in recent years, the ink jet recording method has come to be used for recording to various kinds of recording media in various fields. In particular, from a viewpoint of supporting a printing method in which a low absorption recording medium is targeted, instead of an aqueous ink of the related art, a nonaqueous ink which does not substantially contain water as a solvent has been developed.

As the printing method targeting a low absorption recording medium, gravure printing for soft packing material, flexography printing for sanitary products, silk screen printing for metal plates, ink jet printing for indoor and outdoor advertisements, and the like are commonly known. However, it is common that the nonaqueous ink used for these printing methods uses solvents such as toluene, ethyl acetate, methyl ethyl ketone, methyl isobutyl ketone, and cyclohexane which are class-2 organic solvents, handling is difficult due to obligations such as setting the environmental concentration, installing local exhaust facilities from smells and the like, or performing regular medical examinations arise, thereby a nonaqueous ink with higher health and safety properties has been desired.

From such a viewpoint, a nonaqueous ink which contains solvents, which are not class-2 organic solvents, such as glycol ether acetates such as ethylene glycol monobutyl ether acetate and cyclic esters such as γ-butyrolactone has been proposed (for example, see JPA-2005-200469).

However, since the solvent included in a nonaqueous ink such as the above has a poor ability to dissolve the front surface of a low absorption recording medium, there are cases in which the fixing property of the image which is recorded onto the low absorption recording medium is inferior. In addition, since the ability of the low absorption recording medium to absorb a solvent is poor, when an image is recorded onto the low absorption recording medium using a nonaqueous ink such as the above, there are cases where the front surface drying properties are significantly reduced. In addition, in a nonaqueous ink such as the above, there are cases where smudging of the recorded image becomes prominent depending on the type of low absorption recording medium that is used.

SUMMARY

An advantage of some aspects of the invention is to provide a nonaqueous ink composition for ink jet printing in which there are few smudges on images recorded to a low absorption recording medium is rare, the fixing properties and front surface drying properties of the image are excellent, and health and safety properties are excellent, as well as an ink jet recording method which uses the nonaqueous ink composition for ink jet printing.

The invention may be realized as the following forms or application examples.

APPLICATION EXAMPLE 1

According to Application Example 1, there is provided a nonaqueous ink composition for ink jet recording including: a compound represented by General Formula (1) below; and a heterocyclic compound selected from lactones and lactams,

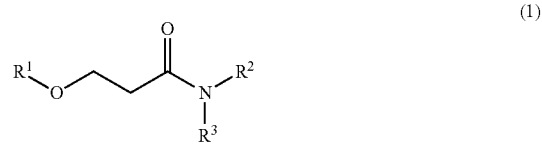

(In Formula (1), $R^1$ represents an alkyl group having 1 to 4 carbon atoms, and $R^2$ and $R^3$ represent a methyl group or an ethyl group).

According to the nonaqueous ink composition for ink jet recording of Application Example 1, the fixing properties and the front surface drying properties of the image recorded to a low absorption recording medium (in particular, a recording medium which contains vinyl chloride resin on the recording surface) are improved, and occurrence of smudging may be suppressed. In addition, since it becomes possible to decrease or not contain a class-2 organic solvent which is used in a nonaqueous ink composition of the related art, this is also excellent from a viewpoint of health and safety properties.

APPLICATION EXAMPLE 2

In the nonaqueous ink composition for ink jet recording according to Application Example 1, in the General Formula (1), $R^1$ is a methyl group.

APPLICATION EXAMPLE 3

In the nonaqueous ink composition for ink jet recording according to Application Example 1 or Application Example 2, a content ratio (MA/MB) between a content of the compound represented by the General Formula (1) [MA(mass %)] and a content of the heterocyclic compound [MB(mass %)] is from 0.1 to 9.

APPLICATION EXAMPLE 4

In the nonaqueous ink composition for ink jet recording according to any one of Application Example 1 to Application Example 3, a total (MA+MB) of a content of the compound represented by the General Formula (1) [MA(mass %)] and a content of the heterocyclic compound [MB(mass %)] is from 6 mass % to 40 mass %.

APPLICATION EXAMPLE 5

In the nonaqueous ink composition for ink jet recording according to any one of Application Example 1 to Application Example 4, the lactones have 6 or less carbon atoms.

APPLICATION EXAMPLE 6

In the nonaqueous ink composition for ink jet recording according to any one of Application Example 1 to Application Example 4, the lactams is a pyrrolidone derivative.

APPLICATION EXAMPLE 7

The nonaqueous ink composition for ink jet recording according to any one of Application Example 1 to Application Example 6 further including an alkylene glycol compound.

APPLICATION EXAMPLE 8

According to Application Example 8, an ink jet recording method is provided including: discharging droplets of the nonaqueous ink composition for ink jet recording according to any one of Application Example 1 to Application Example 7; and recording an image by adhering the droplets to a recording surface containing a vinyl chloride resin.

APPLICATION EXAMPLE 9

According to Application Example 9, there is provided an ink jet recording method according to Application Example 8, in which, the recording surface has an irregularity shape; and a height difference of irregularities is from 0.01 mm to 1 mm.

DESCRIPTION OF EXEMPLARY EMBODIMENTS

Below, description will be given of favorable embodiments of the invention. The embodiments described below are for describing examples of the invention. In addition, the invention is not limited by the below embodiments and includes various types of modifications carried out in a range not departing from the gist of the invention.

1. NONAQUEOUS INK COMPOSITION FOR INK JET RECORDING

The nonaqueous ink composition for ink jet recording (hereinafter also referred to as simply "nonaqueous ink composition") according to an embodiment of the invention contains the compound represented by General Formula (1) below and a heterocyclic compound selected from lactones and lactams. A compound represented by General Formula (1) and lactones are organic solvents which function as a solvent of the nonaqueous ink.

In an aspect of the invention, the term "nonaqueous ink composition" means that water will not be intentionally added when manufacturing the ink composition, and it is not a concern even if a minute amount of unavoidable moisture during manufacturing or during storage of the ink composition is contained.

Components included in the nonaqueous ink composition according to the present embodiment are described in detail as follows.

1.1. Organic Solvents 1.1.1. Compound Represented by General Formula (1)

The nonaqueous ink composition according to the present embodiment contains the compound represented by General Formula (1) below.

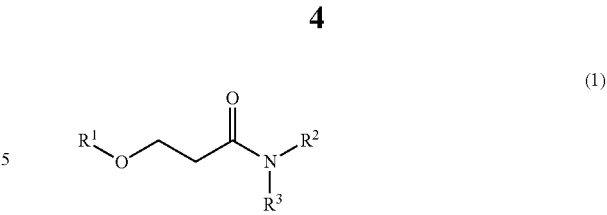

In Formula (1), $R^1$ represents an alkyl group having 1 to 4 carbon atoms, and $R^2$ and $R^3$ represent a methyl group or an ethyl group. The "alkyl group having 1 to 4 carbon atoms" may be a linear or a branched alkyl group, for example, may be a methyl group, an ethyl group, an n-propyl group, an iso-propyl group, an n-butyl group, a sec-butyl group, an iso-butyl group, or a tert-butyl group. As the compound represented by Formula (1), 1 type may be used independently, or 2 or more types may be mixed and used.

Examples of a function of the compound represented by Formula (1) include increasing the front surface drying properties and the fixing properties of the ink adhered to a low absorption recording medium. In particular, the compound represented by Formula (1), has an excellent effect of dissolving vinyl chloride resin. Therefore, the compound represented by Formula (1) dissolves the recording surface which contains a vinyl chloride resin and ink may infiltrate the inside of a low absorption recording medium. Due to the ink infiltrating the low absorption recording medium in this manner, the ink fixes strongly, and the front surface of the ink dries easier. Therefore, the obtained image has excellent abrasion resistance and front surface drying properties.

In addition, in Formula (1), it is preferable for $R^1$ to be a methyl group having 1 carbon atom. In Formula (1), the standard boiling point of the compound, in which $R^1$ is a methyl group, is low in comparison to the standard boiling point of the compound, in which $R^1$ is an alkyl group having 2 to 4 carbon atoms. Therefore, in Formula (1), when the compound in which $R^1$ is a methyl group is used, there are cases in which the front surface drying properties of a recorded image is further improved.

The HLB value of the compound represented by Formula (1) is preferably from 8.0 to 20.0, more preferably from 8.5 to 18.5 and particularly preferably from 12.0 to 18.5. When the HLB value of the compound represented by Formula (1) is within the above ranges, it is favorable from the point of interaction with the vinyl chloride-based resin. Furthermore, the HLB value in the present specification is the value calculated according to Formula (2) below from the ratio between the nonpolar value (I) and the organic value (O) (hereinafter, also simply referred to as the "I/O value") in an organic conceptual diagram.

$$HLB\ value=(\text{nonpolar value }(I)/\text{organic value }(O))\times 10 \quad (2)$$

Specifically, the I/O value may be calculated based on the respective documents Atsushi Fujita's "Systematic Organic Qualitative Analysis Mixtures" published in 1974 by KAZAMASHOBO, Nobuhiko Kuroki's "Theoretical Chemistry of Dyeing" published in 1966 by Maki bookstore, and Hiroo Inoue's "Organic Compound Separation Method" published in 1990 by Shokabo Publishing.

The content of the compound represented by Formula (1), in regard to the total mass of the nonaqueous ink composition, preferably from 1 mass % to 30 mass %, more preferably from 3 mass % to 20 mass %, and particularly preferably from 10 mass % to 20 mass %. Due to the content of the compound represented by Formula (1) being within the above ranges, there are cases in which the abrasion resistance and the front surface drying properties of the image may be further improved.

1.1.2. Heterocyclic Compounds Selected from Lactones and Lactams

The nonaqueous ink composition according to the present embodiment contains a heterocyclic compound selected from lactones and lactams. Examples of the function of the heterocyclic compound include improving the fixing properties of the ink which is adhered to the low absorption recording medium. In particular, since lactones have a favorable effect of dissolving vinyl chloride-based resin, although not to the same extent as the compound represented by Formula (1), the fixing properties of the ink in regard to a low absorption recording medium containing a vinyl chloride-based resin may be improved.

As the lactones, lactones having 6 or less carbon atoms are preferable, and β-propiolactone, β-butyrolactone, γ-butyrolactone, γ-valerolactone, γ-caprolactone, σ-valerolactone, and ε-caprolactone are more preferable. For the lactones, one type thereof may be used independently, and two or more types may also be mixed and used.

As the lactams, from the point that the solubility of a vinyl chloride-based resin is further favorable, a pyrrolidone derivative may be used preferably. Examples of pyrrolidone derivatives include N-methyl-2-pyrrolidone, N-ethyl-2-pyrrolidone, N-vinyl-2-pyrrolidone, 2-pyrrolidone, and 5-methyl-2-pyrrolidone. For the lactams, one type thereof may be used independently, and two or more types may also be mixed and used.

The content of the heterocyclic compound is, in regard to the total mass of the nonaqueous ink composition, preferably from 1 mass % to 30 mass %, more preferably from 3 mass % to 20 mass %, and particularly preferably from 10 mass % to 20 mass %. Due to the content of the heterocyclic compound being within the above ranges, there are cases in which the abrasion resistance of the image may be improved.

When the heterocyclic compound and the compound represented by Formula (1) are used together, occurrence of smudging of the image in regard to various types of low absorption recording media may be suppressed according to the synergistic effect of these compounds. For example, even if the materials which configure a low absorption recording medium are the same, there are cases in which smudging on the recorded image is apt to occur depending on the state of the front surface. In such a case, regardless of the front surface state of the low absorption recording medium, a favorable image with few smudges may be recorded by using both compounds (the heterocyclic compound and the compound represented by Formula (1)) together.

The content ratio (MA/MB) between the content of the compound represented by the above General Formula (1) [MA(mass %)] and the content of the heterocyclic compound [MB(mass %)] is preferably from 0.1 to 9, and more preferably from 0.5 to 2. When the content ratio of both compounds is within the above ranges, an image in which there are few smudges and the front surface drying properties and the abrasion resistance are excellent may be obtained.

In addition, the total (MA+MB) of the content of the compound represented by the above General Formula (1) [MA (mass %)] and the content of the heterocyclic compound [MB(mass %)] is preferably from 6 mass % to 40 mass %, more preferably from 10 mass % to 40 mass %, and particularly preferably from 20 mass % to 30 mass %. Due to the total of the content of both compounds being within the above ranges, an image in which there are few smudges and the front surface drying properties and the abrasion resistance are excellent may be obtained. In particular, since the ink droplets adhered onto the low absorption recording medium may be maintained at a suitable size by keeping the total of both compounds from exceeding 30 mass %, there are cases in which an image where the filling of the ink is favorable and there are few line irregularities may be obtained. In addition, when 10 mass % or more of both compounds is respectively contained, there are cases in which smudging of the image becomes even less apt to occur.

1.2. Other Components

The nonaqueous ink composition according to the present embodiment may also contain an organic solvent other than the organic solvents described above, surfactants, pigments, dispersing agents, and the like as necessary.

1.2.1. Other Organic Solvents

It is preferable for the nonaqueous ink composition according to the present embodiment to contain a liquid alkylene glycol compound at a normal temperature and a normal pressure from the viewpoint of strongly fixing ink to a vinyl chloride-based resin.

As the alkylene glycol compound, an ethylene glycol compound or a propylene glycol compound such as those disclosed in WO2002/055619A is preferable.

In a case where an alkylene glycol compound is contained in the nonaqueous ink composition according to the present embodiment, the alkylene glycol compound may be suitability selected according to the printing characteristics, however, the content thereof in regard to the total mass of the nonaqueous ink composition is preferably from 20 mass % to 85 mass %.

Examples of a preferable ethylene glycol compound include monoethers or diethers of ethylene glycol, diethylene glycol, triethylene glycol, tetraethylene glycol or polyethylene glycol, and a diethylene glycol compound is preferable. In addition, examples of a preferable propylene glycol compound include monoethers or diethers of propylene glycol, dipropylene glycol, tripropylene glycol or polypropylene glycol, and a dipropylene glycol is preferable. Furthermore, among the ethylene glycol compounds, ethylene glycol monomethyl ether, ethylene glycol monoethyl ether, ethylene glycol monoethyl ether acetate and ethylene glycol monobutyl ether are classified as class-2 organic solvents, therefore from a viewpoint of reducing the difficulty of handling and the burden on the environment and the like, it is preferable not to use these.

As the diethylene glycol compound, for example, the diethylene glycol compound represented by General Formula (3) below may be used.

$$R^4-(OC_2H_4)_2-O-R^5 \qquad (3)$$

In Formula (3), $R^4$ and $R^5$ are independently hydrogen atoms, alkyl groups having 1 to 4 carbon atoms or $R^6CO$ groups, respectively. $R^6$ is an alkyl group having 1 to 4 carbon atoms. The "alkyl group having from 1 to 4 carbon atoms" may be a linear or a branched alkyl group, for example, may be a methyl group, an ethyl group, an n-propyl group, an iso-propyl group, an n-butyl group, a sec-butyl group, or a tert-butyl group. Specific examples of a diethylene glycol compound represented by Formula (3) include diethylene glycol, diethylene glycol monomethyl ether, diethylene glycol dimethyl ether, diethylene glycol methyl ethyl ether, diethylene glycol monoethyl ether, diethylene glycol diethyl ether, diethylene glycol mono n-butyl ether, diethylene glycol di n-butyl ether, diethylene glycol butyl methyl ether, diethylene glycol monoethyl ether acetate, diethylene glycol mono n-butyl ether acetate, and the like.

For example, as the dipropylene glycol compound, a dipropylene glycol compound represented by General Formula (4) below may be used.

$$R^7-(OC_3H_6)_2-O-R^8- \quad (4)$$

In Formula (4), $R^7$ and $R^8$ are independently hydrogen atoms, alkyl groups having 1 to 4 carbon atoms, or $R^9CO$ groups, respectively. $R^9$ is an alkyl group having 1 to 4 carbon atoms. The "alkyl group having 1 to 4 carbon atoms" may be a linear or a branched alkyl group, for example, may be a methyl group, an ethyl group, an n-propyl group, an isopropyl group, an n-butyl group, a sec-butyl group, or a tert-butyl group. Examples of the dipropylene glycol compound represented by Formula (4) include, for example, dipropylene glycol, dipropylene glycol monomethyl ether, dipropylene glycol monoethyl ether, and the like.

The diethylene glycol compound and the dipropylene glycol compound which may be used in the nonaqueous ink composition according to the present embodiment, preferably have a boiling point at normal pressure of 150° C. or more, more preferably of 180° C. or more, respectively.

In addition, the diethylene glycol compound and the dipropylene glycol compound which may be used in the nonaqueous ink composition according to the present embodiment preferably have a steam pressure at 20° C. of 1 hPa or less, and more preferably of 0.7 hPa or less.

By using the diethylene glycol compound and the dipropylene glycol compound described above which satisfy the conditions of a high boiling point and a low steam pressure, the burden of providing localized exhaust facilities or exhaust gas processing facilities is reduced, improving the working environment becomes possible, and it is also possible to reduce the environmental burden to the surrounding environment.

The nonaqueous ink composition according to the present embodiment, in addition to the previously disclosed diethylene glycol compound, the dipropylene glycol compound, or combinations thereof, may also contain a polyalkylene glycol compound which is a liquid at normal temperature and normal pressure, and is represented by General Formula (5).

$$R^{11}-(OR^{10})_n-O-R^{12} \quad (5)$$

In Formula (5), $R^{10}$ is an alkylene group having 2 to 3 carbon atoms. $R^{11}$ and $R^{12}$ are each independently hydrogen atoms, or alkyl groups having 1 to 6 carbon atoms (preferably alkyl groups having 1 to 4 carbon atoms). n is an integer of from 3 to 6. Examples of the alkylene group having 2 to 3 carbon atoms include, for example, ethylene groups and propylene groups. The "alkyl group having 1 to 6 carbon atoms" may be a linear or branched alkyl group, for example, in addition to the "alkyl group having 1 to 4 carbon atoms", may be a linear or branched pentyl group or hexyl group.

The polyalkylene glycol compounds which may be used in the nonaqueous ink composition according to the present embodiment preferably have a boiling point at normal pressure of 200° C. or more, more preferably 250° C. or more. In addition, the ignition point thereof is preferably 100° C. or more, and more preferably 130° C. or more. By using such a polyalkylene glycol compound, volatilization suppression may be given to the nonaqueous ink composition. For example, sedimentation of the solid content in the tube may be prevented or reduced by suppressing volatilization of the nonaqueous ink composition in a tube which transports the nonaqueous ink composition to the ink jet recording head from the ink cartridge.

Examples of a preferable polyalkylene glycol compound include, for example, a polyalkylene glycol monoalkyl ether, a polyalkylene glycol dialkyl ether, or the like. For the compounds, one type thereof may be used independently, and two or more types may also be mixed and used.

Examples of the polyalkylene glycol monoalkyl ether include, for example, triethylene glycol monomethyl ether, triethylene glycol monobutyl ether, tripropylene glycol monobutyl ether, the polyethylene glycol monobutyl ether where n is from 4 to 6 in the General Formula (5), tetraethylene glycol monomethyl ether, pentaethylene glycol monomethyl ether, hexaethylene glycol monomethyl ether, and the like.

An example of the polyalkylene glycol dialkyl ether includes tetraethylene glycol dimethyl ether.

In addition, the nonaqueous ink composition according to the present embodiment may further contain, other than the previously exemplified organic solvent, the organic solvent exemplified below.

Examples of the other organic solvent, preferably a polar organic solvent, include for example, a alcohols (for example, ethyl alcohol, 1-propanol, fluoroalcohol, and the like), ethers (for example, diethyl ether, dipropyl ether, and the like) and the like.

Furthermore, from a viewpoint of the ease of use and a reduction of the environmental burden and the like, it is preferable that the nonaqueous ink composition according to the present embodiment does not contain a class-2 organic solvent (refer to annexed 6-2 of the Industrial Safety and Health Law Enforcement Ordinance).

1.2.2. Surfactant

In the nonaqueous ink composition according to the present embodiment, other than the above organic solvent, from a viewpoint of decreasing the surface tension and improving the wettability with the recording medium, a silicon-based surfactant, a fluorine-based surfactant, or a polyoxyethylene derivative which is a non-ionic surfactant may also be added.

As the silicon-based surfactant, it is preferable to use a polyester modified silicon or a polyether modified silicon. Specific examples of silicon-based surfactant include BYK-347, 348, BYK-UV3500, 3510, 3530, and 3570 (all manufactured by BYK Japan KK).

As the fluorine-based surfactant, it is preferable to use a fluorine modified polymer, and a specific example thereof includes BYK-340 (manufactured by BYK Japan KK).

In addition, as the polyoxyethylene derivative, it is preferable to use an acetylene glycol-based surfactant. Specific examples include Surfynol 82, 104, 465, 485, and TG (all manufactured by Air Products and Chemicals Japan Inc.), Olefin STG, and E1010 (all manufactured by Nissin Chemical Industry Co., Ltd.), Nonion A-10R, and A-13P (all manufactured by NOF Corporation), Flowlen TG-740W, and D-90 (manufactured by Kyoeisha Chemistry Co., Ltd.), Noigen CX-100 (manufactured by Dai-ichi Kogyo Seiyaku Co., Ltd.) and the like.

The content of the surfactant in the nonaqueous ink composition according to the present embodiment is preferably from 0.05 mass % to 3 mass %, and more preferably from 0.5 mass % to 2 mass %.

1.2.3. Pigments

In the nonaqueous ink composition according to the present embodiment, as the color material, a pigment of a colored inorganic pigment, a colored organic pigment, or the like which is generally used in the nonaqueous ink composition of the related art may be used. For the pigments, one type thereof may be used independently, and two or more types may also be mixed and used.

Examples of the pigment include, for example, azo pigments such as azo lake, insoluble azo pigments, condensed azo pigments, and chelate azo pigments; polycyclic pigments such as phthalocyanine pigments, perylene and perylene pigments, anthraquinone pigment, quinacridone pigment, dioxazine pigments, thioindigo pigments, isoindolinone pigments, and quinophthalone pigments; dye lakes such as basic dye type lakes, and acid dye type lakes; organic pigments such as nitro pigments, nitroso pigments, aniline black, and daylight fluorescent pigments; inorganic pigments such as carbon black, and the like. The average primary particle diameter of a pigment particle is not particularly limited, however, it is preferably from 50 nm to 500 nm.

Examples of the pigment in a case in which the nonaqueous ink composition according to the present embodiment is magenta or red ink, include for example, C.I. pigment red 2, C.I. pigment red 3, C.I. pigment red 5, C.I. pigment red 6, C.I. pigment red 7, C.I. pigment red 15, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 170, C.I. pigment red 177, C.I. pigment red 178, C.I. pigment red 194, C.I. pigment red 209, C.I. pigment red 222, C.I. pigment red 224, and the like.

Examples of the pigment in a case where the nonaqueous ink composition according to the present embodiment is an orange or a yellow ink, for example, C.I. pigment orange 31, C.I. pigment orange 43, C.I. pigment orange 64, C.I. pigment yellow 12, C.I. pigment yellow 13, C.I. pigment yellow 14, C.I. pigment yellow 15, C.I. pigment yellow 17, C.I. pigment yellow 74, C.I. pigment yellow 93, C.I. pigment yellow 94, C.I. pigment yellow 128, C.I. pigment yellow 138, C.I. pigment yellow 150, C.I. pigment yellow 180, and the like.

Examples of the pigment in a case where the nonaqueous ink composition according to the present embodiment is a green or a cyan ink, include for example, C.I. pigment blue 15, C.I. pigment blue 15:2, C.I. pigment blue 15:3, C.I. pigment blue 16, C.I. pigment blue 60, C.I. pigment green 7, C.I. pigment green 36, and the like.

Examples of the pigment in a case where the nonaqueous ink composition according to the present embodiment is a black ink, include for example, carbon black and the like.

Examples of the pigment in a case where the nonaqueous ink composition according to the present embodiment is a white ink, include for example, Pigment White 6, 18, 21, and the like.

The content of the pigment in the nonaqueous ink composition according to the present embodiment may be appropriately selected according to the application and the printing characteristics, however, it is preferably from 0.5 mass % to 25 mass %, more preferably from 0.5 mass % to 15 mass %, and particularly preferably from 1 mass % to 10 mass %.

In the nonaqueous ink composition according to the present embodiment, from a viewpoint of improving the dispersion stability of the pigment, an arbitrary dispersing agent used in an ordinary nonaqueous ink composition may be used. As the dispersing agent, it is preferable to use a dispersing agent which acts effectively when the dissolution parameter of the organic solvent is from 8 to 11. Specific examples of such a dispersing agent include polyester-based polymer compounds such as Hinoact KF1-M, T-6000, T-7000, T-8000, T-8350P, and T-8000E (all manufactured by Takefu Fine Chemical Co., Ltd.), Solsperse20000, 24000, 32000, 32500, 33500, 34000, 35200, and 37500 (all manufactured by the LUBRIZOL Corporation), Disperbyk-161, 162, 163, 164, 166, 180, 190, 191, and 192 (all manufactured by BYK Japan KK), Flowlen DOPA-17, 22, 33, and G-700 (all manufactured by Kyoeisha Chemistry Co., Ltd.), Ajisper PB821, and PB711 (all manufactured by Ajinomoto Fine-Techno Co., Inc.), LP4010, LP4050, LP4055, POLYMER400, 401, 402, 403, 450, 451, and 453 (all manufactured by EFKA CHEMICALS B.V.).

In the nonaqueous ink composition according to the present embodiment, the content of the dispersing agent may be appropriately selected according to the pigment to be dispersed, however, in regard to a content of 100 parts of the pigment in the nonaqueous ink composition, it is preferably from 5 parts to 200 parts, and more from 30 parts to 120 parts.

1.2.4. Other Components

In the nonaqueous ink composition according to the present embodiment, other additives contained in a normal nonaqueous ink composition may be further added. Examples of the other additives include, for example, stabilizers such as an antioxidant or an ultraviolet ray absorber, or binder resins and the like.

Examples of the antioxidant include, for example, BHA (2,3-butyl-4-oxyanisole), BHT (2,6-di-t-butyl-p-cresol), and the like.

Examples of the ultraviolet ray absorber include, for example, a benzophenone-based compound, a benzotriazole-based compound, and the like.

In the nonaqueous ink composition according to the present embodiment, a binder resin may also be added in order to adjust the viscosity of the ink. Examples of the binder resin include, for example, fibrous-based resins such as acrylic resins, styrene acrylic resins, rosin modified resins, phenol resins, terpene-based resins, polyester resins, polyamide resins, epoxy resins, vinyl chloride vinyl acetate copolymer resins, and cellulose acetate butyrates; vinyl toluene-α-methyl styrene copolymer resins, and the like. For the binder resins, one type thereof may be used independently, and two or more types may also be mixed and used. Furthermore, the binder resin, according to the addition amount thereof, may make the fixing properties of the ink to the vinyl chloride-based resin more favorable.

1.3. Manufacturing Method of Nonaqueous Ink Composition

The nonaqueous ink composition according to the present embodiment may be manufactured using a well-known method. When a pigment is used as the color material, first, after mixing a pigment, a dispersing agent and an organic solvent (partial), the pigment dispersion liquid is prepared using a ball mill, a bead mill, a supersonic wave, or a jet mill and the like, and the nonaqueous ink composition is adjusted so as to have the desired ink characteristics. Subsequently, the nonaqueous ink composition may be obtained by adding the organic solvent (residual quantity) and the other additives (for example, a surfactant or a binder resin) during stirring.

1.4. Physical Properties

In the nonaqueous ink composition according to the present embodiment, from a viewpoint of the recording quality and the reliability and balance as an ink composition for an ink jet, the surface tension at 20° C. is preferably from 20 mN/m to 50 mN/m, and more preferably from 25 mN/m to 40 mN/m. Furthermore, the measurement of the surface tension may be measured by checking the surface tension when wet ink is applied to a platinum plate in an environment of 20° C. by using a Full Automatic Surface Tensiometer CBVP-Z (manufactured by Kyowa Interface Science Co., Ltd.).

In addition, from a similar viewpoint, the viscosity at 20° C. of the nonaqueous ink composition according to the present embodiment is preferably from 2 mPa·s to 15 mPa·s, and more preferably from 2 mPa·s to 10 mPa·s. Furthermore, the measurement of the viscosity may be measured by raising the Shear Rate from 10 to 1000 and reading the viscosity when the Shear Rate is at 200 in an environment of 20° C. by using a Viscoelastic Testing Machine MCR-300 (manufactured by Pysica Co., Ltd).

2. INK JET RECORDING METHOD

The ink jet recording method according to the present embodiment discharges droplets of the previously described nonaqueous ink composition and the droplet is adhered to a low absorption recording medium to record an image.

In the present specification, the term "low absorption recording medium" refers to a recording medium in which the water absorption amount in the Bristow method from the beginning of contact to 30 msec$^{1/2}$ is 10 mL/m$^2$ or less, and the recording surface should at least have this property. The Bristow method is a method in the most widespread use as a measuring method of liquid absorption amount in a short time, and is also adopted by the Japan Technical Association of the Pulp and Paper Industry (JAPAN TAPPI). The details of the test method are disclosed in the standard No. 51 "Paper and Cardboard—Liquid Absorbency Test Method—Bristow Method" of the "JAPAN TAPPI Paper and Pulp Test Method 2000 Edition". Furthermore, as the low absorbent recording medium, a non-absorption recording medium which does not absorb water at all is also included.

Examples of the low absorption recording medium include, specifically, sheets, a film, textile products, and the like containing a low absorption material. In addition, the low absorption recording medium may also have a layer containing a low absorption material (hereinafter also referred to as the "low absorption layer") provided on the front surface of the substrate (for example, paper, fiber, leather, plastic, glass, ceramics, metal, and the like). In examples of the low absorption material, there are no particular limitations, however, olefin-based resins, ester-based resins, urethane-based resins, acrylic-based resins, vinyl chloride-based resins, and the like may be included.

Among these, as the low absorption recording medium, a low absorption recording medium having a recording surface which contains a vinyl chloride-based resin may be preferably used. Specific examples of the vinyl chloride-based resin include vinyl chloride-based copolymer resins such as polyvinylchloride resin, vinyl chloride-ethylene copolymer resin, vinyl chloride-vinyl acetate copolymer resin, vinyl chloride-vinyl ether copolymer resin, vinyl chloride-vinylidene chloride copolymer resin, vinyl chloride-maleic acid ester copolymer resin, vinyl chloride-(meth)acrylic acid copolymer resin, vinyl chloride-(meth)acrylic acid ester copolymer resin, and vinyl chloride-urethane copolymer resin, and the like, and these may be used independently or two or more thereof may be mixed and used. Furthermore, in the present specification, the term "(meth)acrylic" means at least any one of acrylic or the methacrylics which correspond thereto.

Incidentally, the reason is not clear, however, when the front surface of the low absorption recording medium is irregular, the ink droplets which had adhered to the recording medium flow, and there are cases in which smudging occurs in the recorded image. According to the nonaqueous ink according to the present embodiment, the low absorption recording medium may not only be provided with a smooth recording surface (the height difference of the irregularities is less than 0.01 mm), and an irregularly shaped recording surface may also be used preferably. The height difference of the irregularities is preferably from 0.01 mm to 1 mm, and is measured by using an optical microscope or the like. The irregularity shape may be formed by a well-known processing method such as the embossing process, and when a recording medium provided with a low absorption layer is used for the recording surface, may be formed based on the undercoat layer of the low absorption layer.

Specifically, the irregularity shape formed based on the undercoat layer is formed by laminating a low absorption layer onto the undercoat layer of the fibrous base fabric (for example, textiles, knitted products, non-woven fabrics, and the like) and running the low absorption layer along the front surface of the fibrous base fabric. Examples of the material (fiber) used for the fibrous base fabric include synthetic fibers such as polyethylene fibers, polypropylene fibers, polyester fibers, nylon fibers, and vinylon fibers; natural fibers such as cotton, hemp, silk, and wool.

Furthermore, the various characteristics such as the thickness, shape, color, softening temperature, and the hardness of the low absorption recording medium are not particularly limited.

The previously described nonaqueous ink composition contains the compound represented by the General Formula (1) and lactones, and both compounds have an excellent effect of dissolving vinyl chloride-based resin, and to inhibit smudging of the image according to the synergistic effect. Therefore, the ink jet recording method according to the present embodiment may record a further image with few smudges and having excellent fixability and front surface drying properties by adhering droplets of the previously described nonaqueous ink composition to a recording surface containing a vinyl chloride-based resin.

The ink jet recording apparatus used in the ink jet recording method according to the present embodiment, there are no particular limitations, however, a drop-on-demand ink jet recording apparatus is preferable. The drop-on-demand ink jet recording apparatus may adopt a piezoelectric device recording method which performs recording by using piezoelectric devices arranged on the recording head, or may adopt a heat jet recording method which performs recording by using heat energy according to a heater or the like of a heating resistance element arranged on the recording head, or the like, and may adopt any recording method. In addition, the nonaqueous ink composition according to the present embodiment may be used favorably, for example, in an ink jet recording method which discharges from a ink jet recording head having a discharge nozzle surface on which an ink-repelling treatment has been performed, because the nonaqueous ink composition has a merit of being inert in relation to the discharge nozzle surface on which an ink-repelling treatment has been performed.

3. EXAMPLES

Hereinafter, specific description will be further given of an aspect of the invention using examples and comparative examples; however, the present embodiment is not limited to these examples.

3.1 Synthesis of Organic Solvent 3.1.1 Compound Represented by Following Formula (6)

19.828 g of N,N-dimethyl acrylamide and 6.408 g of methanol were put into a 300 ml separable flask provided with a stirring apparatus, a thermocouple, and a nitrogen gas introduction pipe, and were stirred while introducing nitrogen gas. Next, 0.338 g of sodium t-butoxide was added, and the reaction was performed for 4 hours at 35° C. After the heating is completed, 150 mg of phosphoric acid was added, and after homogenizing the solution, it was left unattended for three hours. The solution was filtered, precipitate was removed, and the non-reactant in the evaporator was further removed. In this manner, the compound (hereinafter also referred to as "organic solvent A") represented by Formula (6) below was obtained.

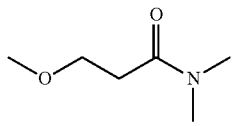

(6)

Furthermore, the HLB value calculated according to Formula (2) from the I/O values in the organic conceptual diagram of the obtained organic solvent A was 18.3.

3.1.2 Compound Represented by Following Formula (7)

19.828 g of N,N-dimethyl acrylamide and 14.824 g of 1-butanol were put into a 300 ml separable flask provided with a stirring apparatus, a thermocouple, and a nitrogen gas introduction pipe, and were stirred while introducing nitrogen gas. Next, 0.338 g of sodium t-butoxide was added, and the reaction was performed for 4 hours at 35° C. After the heating is completed, 150 mg of phosphoric acid was added, and after homogenizing the solution, it was left unattended for three hours. The solution was filtered, precipitate was removed, and the non-reactant in the evaporator was further removed. In this manner, the compound (hereinafter also referred to as "organic solvent B") represented by Formula (7) below was obtained.

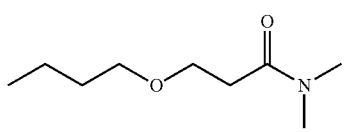

(7)

Furthermore, the HLB value calculated according to Formula (2) from the I/O values in the organic conceptual diagram of the obtained solvent B was 12.2.

3.2 Preparation of Nonaqueous Ink Composition

An amount of the organic solvent which corresponds to the concentration disclosed in Tables 1 to 4 was put into each respective ink container, this was mixed and stirred for 30 minutes using a magnetic stirrer, and a mixed solvent was obtained.

Part of the obtained mixed solvent was separated, a predetermined amount of Solsperse 37500 (manufactured by the LUBRIZOL Corporation, product name), and C.I. pigment black 7 (manufactured by Mitsubishi Chemical Co., Ltd., product name "CARBON BLACK #970") was added, and milling processing was performed using a homogenizer. Subsequently, a pigment dispersion liquid (average particle diameter of pigment: 150 nm) was obtained by performing dispersion processing using a bead mill filled with zirconia beads of 0.3 mm in diameter.

The black ink composition described in Tables 1 to 2 was obtained by adding the remnant of the organic solvent, BYK-340 (a fluorine-based surfactant, manufactured by BYK Japan KK), and Paraloid B60 (an acrylic resin, manufactured by Rohm and Haas Company) to the obtained pigment dispersion liquid, further mixing and stirring for 1 hour, and filtering this using a membrane filter of 5 μm manufactured by PTFE. Furthermore, the numerical values in the Tables 1 to 2 represent mass %.

Furthermore, the materials which were used in the tables are as follows:

C.I. pigment black 7 (a black pigment, manufactured by Mitsubishi Chemical Co., Ltd., product name "CARBON BLACK #970")

Solsperse 37500 (a dispersing agent, manufactured by The LUBRIZOL Corporation, product name)

γ-butyrolactone (an organic solvent, manufactured by Kanto Chemical Co., Ltd.)

γ-valerolactone (an organic solvent, manufactured by Kanto Chemical Co., Ltd.)

σ-valerolactone (an organic solvent, manufactured by Kanto Chemical Co., Ltd.)

2-pyrrolidone (an organic solvent, manufactured by Kanto Chemical Co., Ltd.)

N-methyl-2-pyrrolidone (an organic solvent, manufactured by Kanto Chemical Co., Ltd.)

Diethylene glycol diethyl ether (an organic solvent, manufactured by Nippon Nyukazai Co, Ltd.)

Diethylene glycol ethyl methyl ether (product name "Hisolve EDM", an organic solvent, manufactured by Toho Chemical Industry Co., Ltd.)

Tetraethylene glycol dimethyl ether (product name "Hisolve METM", an organic solvent, manufactured by Toho Chemical Industry Co., Ltd.)

BYK-340 (a fluorine-based surfactant, manufactured by BYK Japan KK, product name)

3.3. Evaluation test 3.3.1. Color Fastness to Rubbing Test

Using the "SP-300V" printer manufactured by Roland DG Corporation, each ink composition obtained in "3.2 Preparation of Nonaqueous Ink Composition" was printed onto a glossy polyvinyl chloride sheet ("SV-G-1270G", manufactured by Roland DG Corporation) at conditions of a 100% duty. Subsequently, an evaluation sample was obtained by drying this for 1 day at normal temperature.

Next, a dry test was performed on the evaluation sample using type I testing equipment according to the Japanese Industrial Standard "JIS L 0849". Subsequently, the OD value of the test cotton cloth was measured using a Spectrolino (manufactured by Gretag Macbeth Co., Ltd.). Furthermore, the evaluation standard is as follows. The evaluation results will be shown in both Table 1 and Table 2.

6: OD value is less than 0.20
5: OD value is from 0.20 to less than 0.25
4: OD value is from 0.25 to less than 0.30
3: OD value is from 0.30 to less than 0.35
2: OD value is from 0.35 to less than 0.40
1: OD value is 0.40 or more.

3.3.2. Front Surface Drying Properties Test

Using the "SP-300V" printer manufactured by Roland DG Corporation, each ink composition obtained in "3.2 Preparation of Nonaqueous Ink Composition" was printed onto a glossy polyvinyl chloride sheet ("SV-G-1270G", manufactured by Roland DG Corporation) at conditions of a 100% duty, after which, the printed product was dried for 5 minutes. Subsequently, scratching was observed on the glossy surface after the glossy polyvinyl chloride sheet was wound using the winding apparatus. In the observation of the scratching, the proportion of the area with scratching was calculated by measuring the surface roughness using a shape measurement laser microscope ("VK-8700 Generation II", manufactured by Keyence Corporation). Furthermore, the evaluation standard is as follows. The evaluation results will be shown in both Table 1 and Table 2.

6: Scratching area is 0%
5: Scratching area is more than 0% and less than 10%

4: Scratching area is from 10% to less than 20%
3: Scratching area is from 20% to less than 30%
2: Scratching area is from 30% to less than 40%
1: Scratching area is 40% or more 3.3.3. Smudging Test Using the "SP-300V" printer manufactured by Roland DG Corporation, each ink composition obtained in "3.2 Preparation of Nonaqueous Ink Composition" was used to print the alphabet A to Z (capital letters and lower-case letters) at a font size of 20 points onto a vinyl chloride banner sheet (IJ8451, a low absorption recording medium having an irregular shaped recording surface manufactured by 3M Co., Ltd.), and a glossy polyvinyl chloride sheet ("SV-G-1270G", a low absorption recording medium having a smooth recording surface, manufactured by Roland DG Co., Ltd.) at conditions of a 100% duty, after which, the printed product was dried for 60 minutes. Subsequently, the smudging was observed using the naked eye.

Furthermore, the front surface of the vinyl chloride banner sheet before printing was observed using a shape measurement laser microscope ("VK-8700 Generation II", manufactured by Keyence Corporation), and the irregularity shape of the front surface was selected at random across 10 points. Then, when the height difference of the irregularities was measured, the arithmetical mean of the 10 points was 0.26 mm (a minimum value of 0.12 mm, and a maximum value of 0.37 mm).

In addition, the evaluation standard is as follows. The evaluation results will be shown in both Table 1 and Table 2.
3: Smudging is not recognized
2: All characters can be easily distinguished, smudging is substantially not recognized
1: All characters can be distinguished with difficulty, smudging is clearly recognized 3.3.4. Test to Determine Dot Size Using the "SP-300V" printer manufactured by Roland DG Corporation, each ink composition obtained in "3.2 Preparation of Nonaqueous Ink Composition" was printed onto a vinyl chloride banner sheet (IJ8451, manufactured by 3M Co., Ltd.), under conditions in which dots do not overlap each other. Specifically, after printing a square of 3 cm under conditions of a 30% duty, the printed product was dried for 60 minutes. Subsequently, the dot size was observed using an optical microscope, and the diameter was categorized for every 10 μm. The evaluation results will be shown in both Table 1 and Table 2. Furthermore, an image having a resolution of 300 dpi or more may be printed if the dot size is 80 μm or less.

TABLE 1

| | Material | Example 1 | Example 2 | Example 3 | Example 4 | Example 5 | Example 6 | Example 7 | Example 8 | Example 9 |
|---|---|---|---|---|---|---|---|---|---|---|
| Pigment | C.I. pigment black 7 | 4.00 | 4.00 | 4.00 | 4.00 | 4.00 | 4.00 | 4.00 | 4.00 | 4.00 |
| Dispersion Agent | Solsperse 37500 | 4.00 | 4.00 | 4.00 | 4.00 | 4.00 | 4.00 | 4.00 | 4.00 | 4.00 |
| Organic Solvent | Organic solvent A | 3.00 | | 10.00 | 20.00 | | | 10.00 | 10.00 | 10.00 |
| | Organic solvent B | | 3.00 | | | 1.00 | 9.00 | | | |
| | γ-butyrolactone | 3.00 | 3.00 | 10.00 | 20.00 | 9.00 | 1.00 | | | 10.00 |
| | γ-valerolactone | | | | | | | 10.00 | | |
| | σ-valerolactone | | | | | | | | 10.00 | |
| | diethylene glycol diethyl ether | 51.00 | 51.00 | 37.00 | 17.00 | 47.00 | 47.00 | 37.00 | 37.00 | 37.00 |
| | diethylene glycol ethyl methyl ether | 30.00 | 30.00 | 30.00 | 30.00 | 30.00 | 30.00 | 30.00 | 30.00 | 15.00 |
| | tetraethylene glycol dimethyl ether | | | | | | | | | 15.00 |
| Surfactant | BYK-340 | 1.00 | 1.00 | 1.00 | 1.00 | 1.00 | 1.00 | 1.00 | 1.00 | 1.00 |
| Binder Resin | Paraloid B60 | 4.00 | 4.00 | 4.00 | 4.00 | 4.00 | 4.00 | 4.00 | 4.00 | 4.00 |
| | Total Amount (Mass %) | 100.00 | 100.00 | 100.00 | 100.00 | 100.00 | 100.00 | 100.00 | 100.00 | 100.00 |
| Evaluation Result | Color fastness to rubbing | 6 | 6 | 6 | 6 | 6 | 6 | 6 | 6 | 6 |
| | Front surface drying properties | 6 | 5 | 6 | 6 | 5 | 5 | 6 | 6 | 6 |
| | Smudging (vinyl chloride banner sheet) | 2 | 2 | 3 | 3 | 2 | 2 | 3 | 3 | 3 |
| | Smudging (glossy polyvinyl chloride sheet) | 2 | 2 | 2 | 2 | 2 | 2 | 2 | 2 | 3 |
| | Dot size (μm) | 50 | 50 | 50 | 40 | 50 | 50 | 50 | 50 | 50 |

TABLE 2

| | Material | Comparative Example 1 | Comparative Example 2 | Comparative Example 3 |
|---|---|---|---|---|
| Pigment | C.I. pigment black 7 | 4.00 | 4.00 | 4.00 |
| Dispersion Agent | Solsperse 37500 | 4.00 | 4.00 | 4.00 |
| Organic Solvent | Organic solvent A | 10.00 | | |
| | Organic solvent B | | 10.00 | |
| | γ-butyrolactone | | | 10.00 |
| | γ-valerolactone | | | |
| | σ-valerolactone | | | |
| | diethylene glycol diethyl ether | 47.00 | 47.00 | 47.00 |
| | diethylene glycol ethyl methyl ether | 30.00 | 30.00 | 30.00 |
| | tetraethylene glycol dimethyl ether | | | |

TABLE 2-continued

|  | Material | Comparative Example 1 | Comparative Example 2 | Comparative Example 3 |
|---|---|---|---|---|
| Surfactant | BYK-340 | 1.00 | 1.00 | 1.00 |
| Binder Resin | Paraloid B60 | 4.00 | 4.00 | 4.00 |
| Total Amount (Mass %) |  | 100.00 | 100.00 | 100.00 |
| Evaluation Result | Color fastness to rubbing | 6 | 6 | 4 |
|  | Front surface drying properties | 5 | 5 | 3 |
|  | Smudging (vinyl chloride banner sheet) | 1 | 1 | 1 |
|  | Smudging (glossy polyvinyl chloride sheet) | 2 | 2 | 2 |
|  | Dot size (μm) | 50 | 50 | 50 |

TABLE 3

|  | Material | Example 1 | Example 2 | Example 3 | Example 4 | Example 5 | Example 6 | Example 7 |
|---|---|---|---|---|---|---|---|---|
| Pigment | C.I. pigment black 7 | 4.00 | 4.00 | 4.00 | 4.00 | 4.00 | 4.00 | 4.00 |
| Dispersion Agent | Solsperse 37500 | 4.00 | 4.00 | 4.00 | 4.00 | 4.00 | 4.00 | 4.00 |
| Organic Solvent | Organic solvent A | 3.00 |  | 10.00 | 20.00 |  |  | 10.00 |
|  | Organic solvent B |  | 3.00 |  |  | 1.00 | 9.00 |  |
|  | 2-pyrrolidone | 3.00 | 3.00 | 10.00 | 20.00 | 9.00 | 1.00 |  |
|  | N-methyl-2-pyrrolidone |  |  |  |  |  |  | 10.00 |
|  | diethylene glycol diethyl ether | 50.00 | 50.00 | 36.00 | 16.00 | 46.00 | 46.00 | 36.00 |
|  | diethylene glycol ethyl methyl ether | 30.00 | 30.00 | 30.00 | 30.00 | 30.00 | 30.00 | 30.00 |
| Surfactant | BYK-340 | 2.00 | 2.00 | 2.00 | 2.00 | 2.00 | 2.00 | 2.00 |
| Binder Resin | Paraloid B60 | 4.00 | 4.00 | 4.00 | 4.00 | 4.00 | 4.00 | 4.00 |
|  | Total Amount (Mass %) | 100.00 | 100.00 | 100.00 | 100.00 | 100.00 | 100.00 | 100.00 |
| Evaluation Result | Color fastness to rubbing | 6 | 6 | 6 | 6 | 6 | 6 | 6 |
|  | Front surface drying properties | 6 | 5 | 6 | 6 | 5 | 5 | 6 |
|  | Smudging (vinyl chloride banner sheet) | 2 | 2 | 3 | 3 | 2 | 2 | 3 |
|  | Smudging (glossy polyvinyl chloride sheet) | 2 | 2 | 2 | 2 | 2 | 2 | 2 |
|  | Dot size (μm) | 50 | 50 | 50 | 40 | 50 | 50 | 50 |

TABLE 4

|  | Material | Comparative Example 1 | Comparative Example 2 | Comparative Example 3 |
|---|---|---|---|---|
| Pigment | C.I. pigment black 7 | 4.00 | 4.00 | 4.00 |
| Dispersion Agent | Solsperse 37500 | 4.00 | 4.00 | 4.00 |
| Organic Solvent | Organic solvent A | 10.00 |  |  |
|  | Organic solvent B |  | 10.00 |  |
|  | 2-pyrrolidone |  |  | 10.00 |
|  | N-methyl-2-pyrrolidone |  |  |  |
|  | diethylene glycol diethyl ether | 46.00 | 46.00 | 46.00 |
|  | diethylene glycol ethyl methyl ether | 30.00 | 30.00 | 30.00 |
| Surfactant | BYK-340 | 2.00 | 2.00 | 2.00 |
| Binder Resin | Paraloid B60 | 4.00 | 4.00 | 4.00 |
| Total Amount (Mass %) |  | 100.00 | 100.00 | 100.00 |
| Evaluation Result | Color fastness to rubbing | 6 | 6 | 4 |
|  | Front surface drying properties | 5 | 5 | 3 |
|  | Smudging (vinyl chloride banner sheet) | 1 | 1 | 1 |
|  | Smudging (glossy polyvinyl chloride sheet) | 2 | 2 | 2 |
|  | Dot size (μm) | 50 | 50 | 50 |

3.3.5. Evaluation Result

According to Example 1 to Example 16, it has been shown that by using the compound represented by Formula (1) and a heterocyclic compound selected from lactones and lactams together for the organic solvent, the front surface drying properties and the abrasion resistance thereof are excellent. In addition, it has been shown that an excellent image with few occurrences of smudging in relation to low absorption recording media of different front surface states may be obtained according to the synergistic effect of these organic solvents.

According to Comparative Example 1 to Comparative Example 6, since the compound represented by Formula (1) and a heterocyclic compound selected from lactones and lactams were not used together, an excellent image was not obtained. In particular, in conditions where the dots overlap each other, smudging of the image occurred in relation to low absorption recording media having an irregularity shape for the recording surface. In addition, according to Comparative Examples 3 and 6, since the compound represented by Formula (1) was not used, the color fastness to rubbing and the front surface drying properties were not favorable.

The invention is not limited to the embodiments described above, and various modifications thereof are possible. For example, the invention includes configurations which are the substantially the same as the configurations described in the embodiments (for example, configurations having the same function, method and results, or configurations having the same purpose and effect). In addition, the invention includes configurations in which non-essential parts of the configurations described in the embodiments are replaced. In addition, the invention includes configurations exhibiting the same operation and effect as the configurations described in the embodiments or configurations capable of achieving the same purpose. In addition, the invention includes configurations in which known techniques were added to the configurations described in the embodiments.

What is claimed is:

1. A nonaqueous ink composition for ink jet recording comprising:
    a compound represented by General Formula (1) below; and
    a heterocyclic compound selected from lactones and lactams,

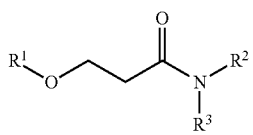

(In Formula (1), $R^1$ represents an alkyl group having 1 to 4 carbon atoms, and $R^2$ and $R^3$ represent a methyl group or an ethyl group),
    wherein, a content ratio (MA/MB) between a content of the compound represented by the General Formula (1) [MA(mass %)] and a content of the heterocyclic compound [MB(mass %)] is from 0.1 to 9.

2. The nonaqueous ink composition for ink jet recording according to claim 1, wherein in the General Formula (1), $R^1$ is a methyl group.

3. The nonaqueous ink composition for ink jet recording according to claim 1, wherein the lactones have 6 or less carbon atoms.

4. The nonaqueous ink composition for ink jet recording according to claim 1, wherein the lactams are a pyrrolidone derivative.

5. The nonaqueous ink composition for ink jet recording according to claim 1, further comprising an alkylene glycol compound.

6. A nonaqueous ink composition for ink jet recording comprising:
    a compound represented by General Formula (1) below; and
    a heterocyclic compound selected from lactones and lactams,

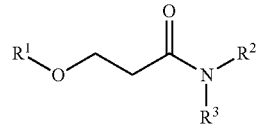

(In Formula (1), $R^1$ represents an alkyl group having 1 to 4 carbon atoms, and $R^2$ and $R^3$ represent a methyl group or an ethyl group),
    wherein, a total (MA+MB) of a content of the compound represented by the General Formula (1) [MA(mass %)] and a content of the heterocyclic compound [MB(mass %)] is from 6 mass % to 40 mass %.

7. The nonaqueous ink composition for ink jet recording according to claim 6, wherein in the General Formula (1), $R^1$ is a methyl group.

8. The nonaqueous ink composition for ink jet recording according to claim 6, wherein the lactones have 6 or less carbon atoms.

9. The nonaqueous ink composition for ink jet recording according to claim 6, wherein the lactams are a pyrrolidone derivative.

10. The nonaqueous ink composition for ink jet recording according to claim 6, further comprising an alkylene glycol compound.

11. An ink jet recording method comprising:
    discharging droplets of the nonaqueous ink composition for ink jet recording according to claim 1; and
    recording an image by adhering the droplets to a recording surface containing a vinyl chloride-based resin.

12. The ink jet recording method of claim 10, wherein the recording surface has an irregularity shape; and
    a height difference of irregularities is from 0.01 mm to 1 mm.

13. An ink jet recording method comprising:
    discharging droplets of the nonaqueous ink composition for ink jet recording according to claim 6; and
    recording an image by adhering the droplets to a recording surface containing a vinyl chloride-based resin.

14. The ink jet recording method of claim 13, wherein the recording surface has an irregularity shape; and
    a height difference of irregularities is from 0.01 mm to 1 mm.

* * * * *